United States Patent [19]

Daffron

[11] 3,904,812

[45] Sept. 9, 1975

[54] LOGIC MODULE

[75] Inventor: Vernon M. Daffron, Ellisville, Mo.

[73] Assignee: Wagner Electric Corporation, Parsippany, N.J.

[22] Filed: Aug. 10, 1973

[21] Appl. No.: 387,260

[52] U.S. Cl......... 174/52 S; 317/101 DH; 339/94 M

[51] Int. Cl............................................... H05k 5/00

[58] Field of Search............ 174/52 S, 50.52, 50.53, 174/65 SS, 77 R; 333/7, 89 M; 200/153 W; 339/17 LC, 176 MP, 89 M, 94 R, 94 M, 94 C, 60 R, 60 M, 60 C

[56] References Cited

UNITED STATES PATENTS

| | | | |
|---|---|---|---|
| 2,288,517 | 6/1942 | Dubilier | 200/153 W |
| 2,563,762 | 8/1951 | Uline et al. | 339/186 M |
| 2,662,219 | 12/1953 | Hennessey, Jr. et al. | 339/82 M |
| 3,176,230 | 3/1965 | Collins | 333/7 |
| 3,324,353 | 6/1967 | Retzlaff et al. | 317/101 R |
| 3,493,916 | 2/1970 | Hansen | 339/17 LC |
| 3,648,337 | 3/1972 | Greskamp et al. | 174/52 S |

*Primary Examiner*—David Smith, Jr.

[57] ABSTRACT

A logic module includes a container for containing at least one printed circuit board. The container is closed by a removable connector base. At least one connector receptacle is formed on the base so as to protrude externally of the closed container. Connector pins are mounted in each receptacle so that one end of the pins protrude into the receptacle for connection to an external electrical connector. Another end of the pins protrudes into the container for connection to the circuit board. The base includes a mounting for the circuit board.

8 Claims, 5 Drawing Figures

LOGIC MODULE

BACKGROUND OF THE INVENTION

This invention relates generally to electronic logic modules and more specifically to containers for protecting such modules from environmental conditions.

Generally, no known logic module assembly containing electronic circuitry is available which permits effective sealing against moisture and other environmental conditions. Presently, if an external electrical connector to the module fails, that is, succumbs to leakage of moisture, such moisture could ultimately have access to the circuit containing module so as to cause that circuit to similarly fail.

Logic modules for anti-skid control systems are housed in containers which may be mounted externally on road vehicles such as tractors or trailers and in some cases the modules may be mounted in the tractor cab. When such modules are mounted externally on the vehicle, they are exposed to unfavorable environmental conditions such as the natural elements and in the case of tanker trailers, such modules may be exposed to highly caustic materials or even acid.

Therefore, there is a need to protect and sealingly isolate the module from the connectors so that in the case of moisture or other environmentally-caused connector failure, there is no apparent anticipation of concurrent module failure.

SUMMARY OF THE INVENTION

Accordingly, the logic module assembly of this invention overcomes the problem of module failure precipitated by moisture or other environmentally-caused connector failure. This is accomplished by providing the module and connector in electrical association while maintaining them disassociated environmentally. The foregoing is effected by providing a logic module assembly comprising a molded or die cast container for containing at least one printed circuit board. The container is sealingly closed by a connector base. At least one connector receptacle is formed on the base so as to protrude externally of the sealed container. Connector pins are sealingly molded into the base so that one end of the pins protrude into the receptacle for connection to an external electrical connector. Another end of the pins extends through the base and into the container for connection to the circuit board. The base further includes a mounting for the circuit board.

The above and further novel features of this invention will appear more fully from the following detailed description when the same is read in connection with the accompanying drawings.

It is to be expressly understood, however, that the drawings are not intended as a definition of the invention but are for the purposes of illustration only.

BRIEF DESCRIPTION OF THE DRAWINGS

In the drawing wherein like parts are marked alike.

DESCRIPTION OF THE PREFERRED EMBODIMENT

Figures 1, 3:
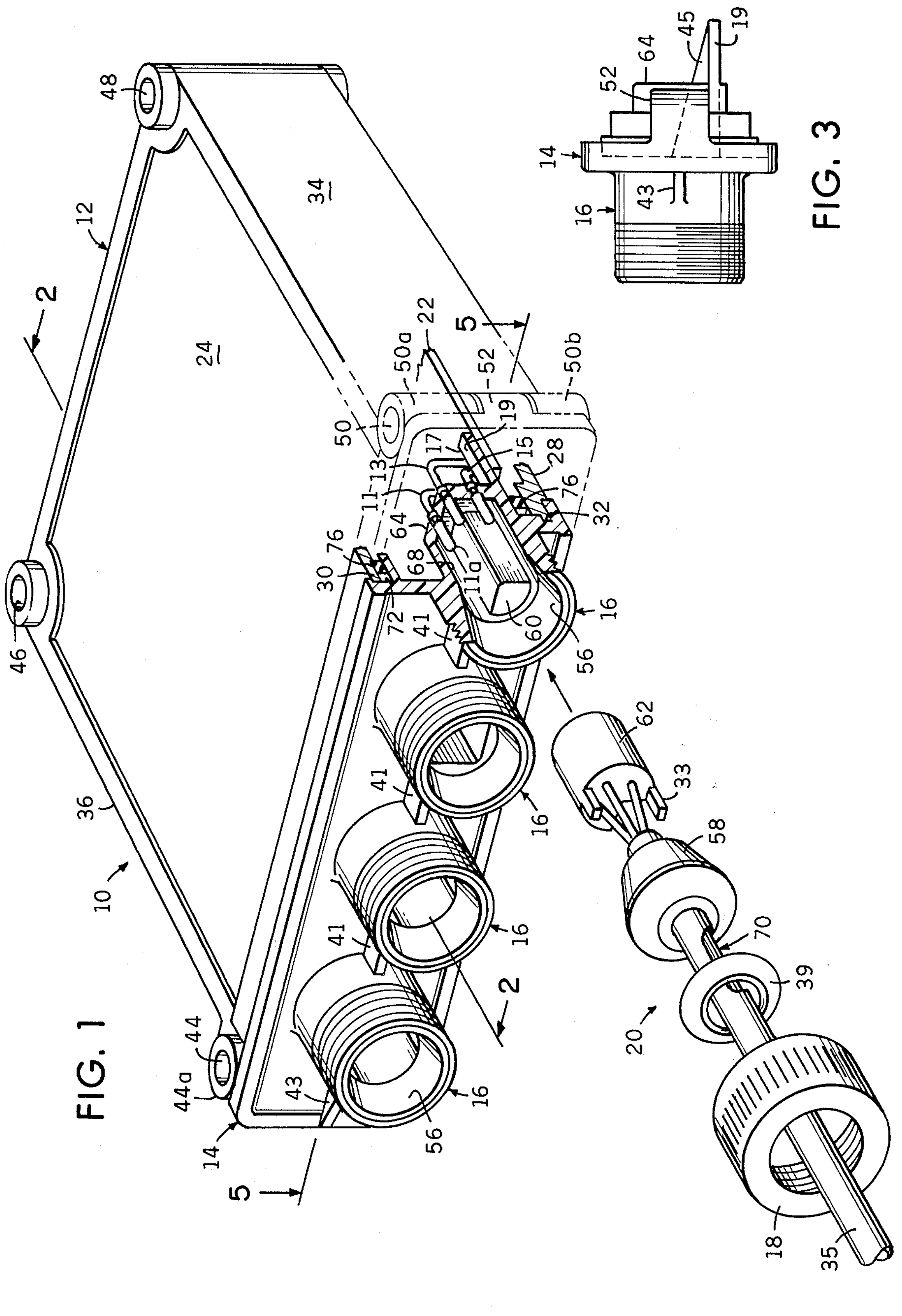
FIG. 1 is an isometric view of the module of this invention.
FIG. 3 is a side elevation of the connector base.

FIG. 1 shows the logic module assembly of this invention, generally designated 10, and including a container 12 closed by a removable connector base 14. The connector base 14 includes connector receptacles 16 which are preferably threaded to receive correspondingly threaded connector cap 18 of the connector assembly generally designated 20.

Container 12 is preferably die cast aluminum although it is contemplated that container 12 may also be formed of alternative materials or may comprise molded thermoplastic. The shape of container 12 as shown in FIG. 1 is generally as a rectangular box so as to accommodate electronic circuitry such as one or more printed circuit (PC) boards 22.

Figures 2, 4, 5:
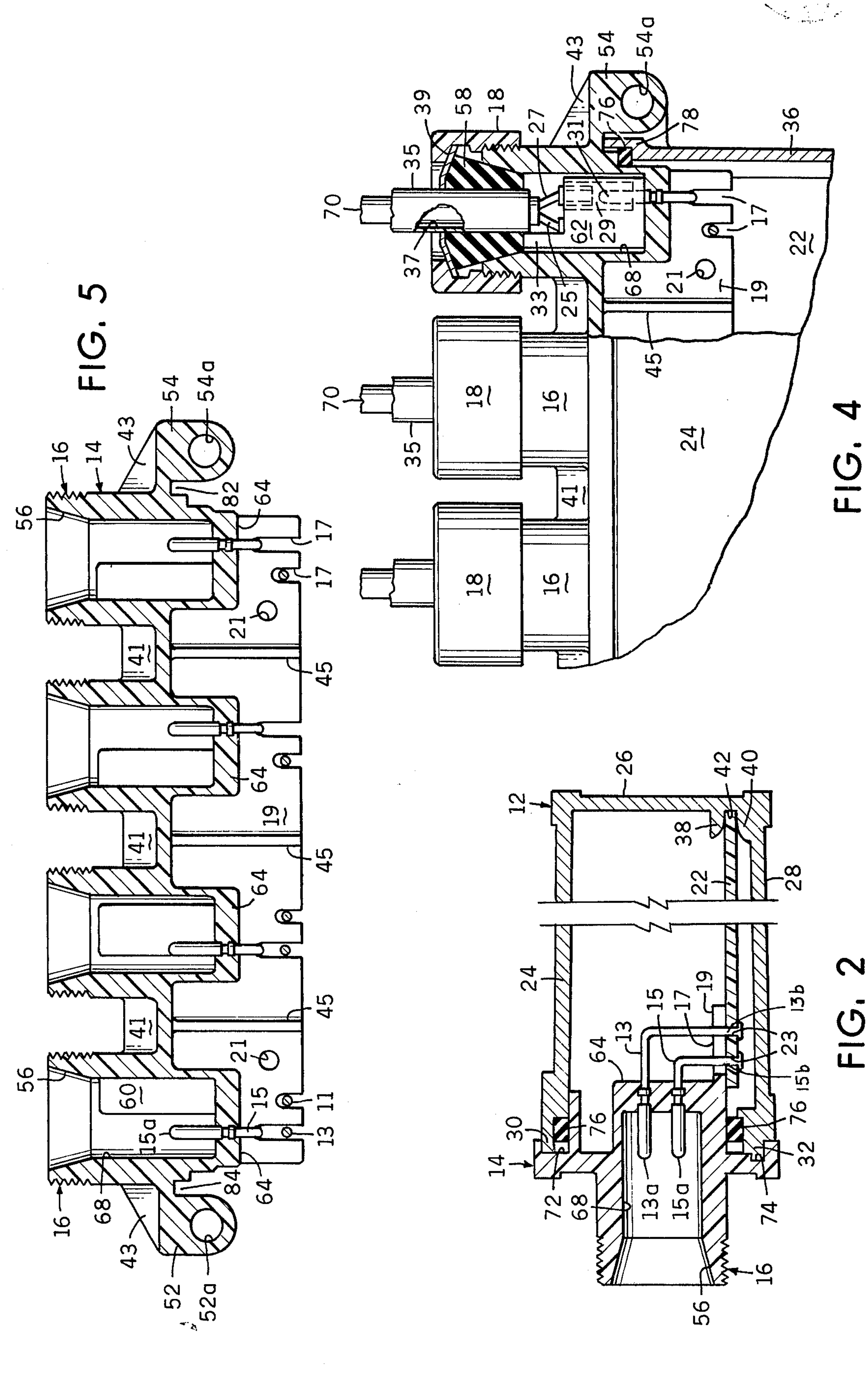
FIG. 2 is a cross-sectional side elevation taken along the line 2—2 of FIG. 1.
FIG. 4 is a partial cross-sectional plan view of a connector assembly secured in a receptacle of the module of this invention.
FIG. 5 is a cross-sectional plan view of the connector base taken along line 5—5 of FIG. 1.

FIG. 2 generally illustrates container 12 as having top portion 24, end 26 and bottom portion 28. Top and bottom portions 24, 28 respectively include tongue portions 30, 32 respectively for mating engagement with corresponding grooves in base 14. Side portion 34, FIG. 1, is opposed to corresponding side portion 36 which is blocked from view in FIG. 1. Nubs or guides 38, 40 respectively form groove 42 with end wall 26 of container 12 to guide and stabilize PC board 22 in position within the container (FIG. 2). Preferably, groove 42 is filled with a flexible setting epoxy to take up any looseness associated with tolerances between groove 42 and PC board 22. However, if it was desired to have a quick-change capability inherent in the logic module assembly 10, i.e. the capability of replacing PC board 22 at will, the use of epoxy would be omitted.

Mounting holes 44, 46, 48 and 50, FIG. 1, are provided in container 12 for mounting assembly 10 to the undercarriage or a portion of the framework of the desired tractor or trailer (not shown). If preferred, an accommodating bracket may be provided on the tractor, trailer or in the cab of the desired vehicle which bracket or framework would be provided with holes to receive mounting bolts (not shown). The bolts may quite readily pass through mounting holes 44, 46, 48 and 50 and through the holes provided in the bracket or framework in order to secure assembly 10 thereto. In the case of a molded thermoplastic container, metal sleeve inserts would be placed within the rear mounting holes 46, 48 to reinforce those holes by taking most of the stress burden from the plastic. But, regardless of the material used to form container 12, such inserts are preferably always used in front mounting holes 44, 50. Rear mounting holes 46, 48 are continuous within container 12 whereas the front mounting holes 44, 50 are interrupted. For example, FIG. 1 shows portions **50*a* and 50*b* of mounting hole 50 which is interrupted to accommodate mounting extension 52 of base 14. Similarly, mounting hole 44** also is interrupted to include portions 44a, 44b (not shown) corresponding to 50*a*, 50*b* of mounting hole 50. A mounting extension 54 (shown in FIGS. 4 and 5) is accommodated between portions 44*a*, 44*b* in a manner similar to that illustrated for extension 52. Mounting extensions 52, 54 are provided with mounting holes 52*a*, 54*a* (FIG. 5) corresponding to holes 50, 44 respectively. Base 14 closes container 12 when mounting extension 52 is inserted between portions **50*a* and 50*b*, mounting extension 54** is inserted between portions 44*a* and 44*b*, holes 52*a* is aligned with hole 50 and holes 54*a* is aligned with hole 44. The metal inserts are then passed through the aligned holes and the mounting bolts are passed through the insert. When the mounting bolts and the inserts are removed, base 14 is removable from container 12.

Base 14 is preferably molded thermoplastic for providing satisfactory insulating properties to assembly 10. As previously discussed, base 14 may be removably mounted with container 12. Base 14 is molded to include at least one connector receptacle 16 integrally formed therewith. Each receptacle protrudes externally of the assembly to the left as viewed in FIG. 1, and is threaded to receive a correspondingly threaded cap 18. Receptacle 16 is tapered at one end 56 to receive correspondingly tapered grommet 58. Also, receptacle 16 is keyed at 60 to receive a correspondingly keyed connector 62. As shown in FIG. 1, each receptacle can be differently keyed to receive its correspondingly keyed connector so as to avoid an inadvertent misconnection.

Reinforcing ribs 41 and 43 may be integrally formed with base 14 to support receptacles 16 therewith. Tapered reinforcing ribs 45 may similarly be provided to support planar portion 19 with respect to base 14 (see FIG. 3).

Receptacle 16 terminates at end wall 64 opposite tapered end 56 wherein connector pins 11, 13 and 15 are molded in place. Recess 68 provides an interconnection between tapered portion 56 and end wall 64. Pins 11, 13 and 15 protrude at one end into recess 68 of receptacle 16 for connection to an external electrical connection or signal carrying cable generally designated 70 at connector assembly 20.

FIG. 2 also illustrates tongue portions 30, 32 of upper and lower portions 24, 28 respectively received in grooves 72, 74 of base 14. Tongue portion 78 of side 36 interconnects tongue portions 30 and 32 (FIG. 4) adjacent extension 54 and a tongue portion 80 (not shown) similarly interconnects tongue portions 30 and 32 adjacent extension 52. Groove portion 82 interconnects groove portions 72 and 74 adjacent extension 54 while groove portion 84 interconnects groove portions 72 and 74 adjacent extension 52 (FIG. 5). In this manner, a continuous tongue and groove fitting is provided for the engagement of base 14 and container 12. Resilient seal 76, preferably of neoprene, is sealingly and continuously fitted into the continuous tongue and groove fitting previously described so that base 14 can be sealingly engaged with container 12.

Conductive pins 11, 13 and 15 are preferably of brass and are preferably molded in position with end wall 64 as shown at FIG. 1. However, if desired, the pins may be ultrasonically inserted or adhesively bonded in end wall 64 as is well known. The one end of the pins 11, 13 and 15 are correspondingly designated 11*a*, 13*a* and 15*a* and protrude into recess 68 and terminate therein. The ends 11*a*, 13*a* and 15*a* and receptacle recess 68 have first relatively substantially parallel axes. As pins 11, 13 and 15 extend through base 64 and toward the interior of container 12 (FIGS. 1 and 2) the pins are turned downward at substantially 90° from the axes of the one ends 11*a*, 13*a* and 15*a*. The pins then extend through grooves 17 formed in a substantially planar portion 19 which is integratedly formed with base 14 and extending from the base into container 12.

Planar portion 19 provides a means for mounting PC board 22 to base 14. Planar portion 19 may also include apertures or openings 21 (FIGS. 4 and 5) for preferably pop riveting PC board 22 thereto. Alternatively, PC board 22 may be bolted to planar portion 19 or may be adhesively bonded thereto in which case apertures 21 are not essential.

PC board 22 also includes apertures or connector pin receptacles 23 for receiving the other ends 11*b*, 13*b* and 15*b* of pins 11, 13 and 15 adjacent the circuit board, planar portion connection. The grooves 17 in base 19 and the connector pin receptacles 23 in PC board 22 may be aligned so that the other ends 11*b*, 13*b* and 15*b* of the pins pass therethrough. In this manner, the other ends 11*b*, 13*b* and 15*b* of the pins which have second substantially relatively parallel axes are substantially normal to the plane of the planar portion (see FIGS. 1 and 2). As a result, the first and second axes are in a substantially relatively normal or perpendicular relationship. The other ends 11*b*, 13*b* and 15*b* of the pins terminate adjacent receptacles 23 and are preferably wave soldered thereto (see FIG. 2). Board 22 and planar portion 19, when connected, are thus rendered substantially relatively parallel thus the pins second axes are also relatively normal to PC board 22.

Receptacle 16 is keyed to receive correspondingly keyed electrical assembly 20 which includes keyed connector 62 preferably of molded thermoplastic. FIG. 4 illustrates cable 70 having leads 25 and 27 terminating in connector 62. A conductive insert 29 receives lead 27 and one end of pin 31 and provides electrical connection therebetween. Extension 33 is integrally formed with connector 62 and extends therefrom to engage grommet 58 to insure proper seating of connector 62 in recess 68 for proper electrical connection with pin 31. Also, extension 33 as shown in FIG. 4 illustrates the preferred spacing of grommet 58 with respect to keyed connector 62 so that extension 33 engages the grommet. In this manner, minimum tensile stress is imposed on leads 25 and 27 of cable 70 when removing connector 62 from receptacle 16.

Sealing grommet 58 is preferably of neoprene and is adjacent keyed connector 62. Tubing 35 extends through grommet 58 and is firmly and sealingly engaged thereby so as not to be slidable therewith. This preferred firm engagement provides sealing protection for the connector assembly 20 when connected to receptacle 16. Also, grommet 58 is tapered to be received by corresponding taper 56 of receptacle 16. Tubing 35 surrounds cable 70 and is preferably of nylon. Both the cable 70 and tubing 35 terminate between grommet 58 and connector 62 as shown in FIG. 4. Tubing 35 is preferably sealed at the termination shown and also at its other termination not shown. This provides a dead air space 37 between the cable 70 and tubing 35. This permits free relative movement of cable 70 within tubing 35. The purpose of nylon tubing 35 is for vapor proofing cable 70 so as to be highly resistant to decomposition caused by acid or highly caustic materials which may otherwise eat through cable 70 thus causing it to short out. Also, in the case of tanker trailers carrying highly volatile materials, tubing 35 may act as a guard against sparks, should a short occur in cable 70.

Connector cap 18 is preferably plastic or may also be die cast aluminum or zinc. Cap 18 is preferably internally threaded to be received by matingly externally threaded receptacle 16. The purpose of cap 18 is to urge grommet 58 into sealing engagement with receptacle 16 and to secure grommet 58 and connector 62 in the receptacle. Also, cap 18 urges grommet 58 into tighter engagement with tubing 35.

Friction washer 39 is preferably of steel although a plastic or other synthetic washer is anticipated. The purpose or washer 39 is to relieve friction between cap 18 and grommet 58.

In operation, the various parts of the assembly having been formed, and pins 11, 13 and 15 being molded in position as shown and described, the other ends 11*b*, 13*b* and 15*b* of the pins are placed in their appropriate receptacles 23 in PC board 22. The other ends are then wave soldered to the board. PC board 22 is also pop riveted to planar portion 19 of base 14, thus joining the base 14 and board 22 as a unit with electrical connection to board 22 being accomplished with pins 11, 13 and 15 via the soldered other ends. Epoxy is then placed in groove 42 and the unitary base 14, PC board 22 is joined with container 12 so that board 22 engages groove 42 and extensions 52, 54 engage interrupted mounting holes 50, 44, respectively. The continuous tongue and groove mating surfaces of container 12 and base 14 being properly seated, mounting hole 52*a* is properly aligned with mounting hole 50 and mounting hole 54*a* is properly aligned with mounting hole 44. Thus, the metal sleeves are placed through mounting holes 44 and 50 to secure base 14 and container 12 and the mounting bolts are then placed through the sleeves to secure the module 10 to appropriate mounting brackets, or the like. Similarly, mounting bolts are inserted through holes 46, 48 but sleeves may not be necessary depending on the material used to form the container.

When module 10 is secured in place, connector assembly 20 is received by receptacle 16 and cap 18 is threadedly engaged by the threaded receptacle to properly seat keyed connector 62. Thus, module 10 sends and receives electrical signals through signal carrying cable 70 preferably vapor proofed by tubing 35. Other appropriate connectors and receptacles are provided as necessary to carry out the required control functions of module 10.

Obviously, many modifications and variations of the present invention are possible in the light of the above teachings. It is therefore to be understood that within the scope of the appended claims the invention may be practiced otherwise than as specifically described.

Having thus described this invention in its best embodiment, that which is desired to be claimed by Letters Patent is:

1. A logic module assembly comprising:
a container for containing electronic circuitry;
a removable connector base closing the container;
at least one connector receptacle formed on the base and protruding outside the closed container;
connector pins mounted in each receptacle, the pins having one end thereof protruding into the receptacle for connection to an external electrical connector, and the other end thereof, opposite the one end, extending through the base and protruding into the container for electrical connection to the circuitry;
the one end of the pins and each receptacle have substantially parallel longitudinal axes;
connector assembly means for electrical connection with each receptacle;
first means included on each connector assembly for radially aligning the connector assembly with its respective receptacle;
sealing means included on the connector assembly for sealingly engaging each connector assembly in its respective receptacle; and
second means included on each connector assembly for permitting the sealing means to urge the connector assembly into proper axial seating with its respective receptacle.

2. The assembly of claim 1 wherein each receptacle further includes:
a recess formed therein having an open first end and a closed second end;
a first portion of the recess extending from the first end into the receptacle toward the second end;
a second portion of the recess extending from the first portion toward the second end; and
a key formed in the second portion and extending substantially along the length of the second portion substantially parallel with the axes.

3. The assembly of claim 1, and further including:
a plurality of extensions formed on the connector and extending therefrom substantially coaxially with the axes when the connector is received in the receptacle.

4. The assembly of claim 1, and further including:
a cable connected to the connector; and
tubing surrounding the cable forming a dead air space between the tubing and the cable.

5. A logic module assembly comprising:
a container for containing electronic circuitry;
at least one connector receptacle included on the container;
key means formed in each receptacle;
connector assembly means for electrical connection with each receptacle;
first means included on each connector assembly for radially aligning the connector assembly with its respective receptacle;
sealing means included on the connector assembly for sealingly engaging each connector assembly in its respective receptacle; and
second means included on each connector assembly for permitting the sealing means to urge the connector assembly into proper axial seating with its respective receptacle.

6. A logic module assembly comprising:
a container for containing electronic circuitry;
at least one connector receptacle included on the container;
key means formed in each receptacle;
connector assembly means for electrical connection with each receptacle;
first means included on each connector assembly for radially aligning the connector assembly with its respective receptacle;
sealing means included on the connector assembly for sealingly engaging each connector assembly in its respective receptacle; and
second means formed on the first means and engageable with the sealing means for permitting the sealing means to urge the connector assembly into proper axial seating with its respective receptacle.

7. A logic module assembly comprising:

a container for containing electronic circuitry;

at least one connector receptacle included on the container;

key means formed in each receptacle;

connector assembly means for connection with each receptacle;

a first portion of the connector assembly means for electrical connection with each receptacle;

a second portion of the connector assembly means for sealingly engaging each connector in its respective receptacle;

first means formed on the first portion for radially aligning the connector assembly with its respective receptacle; and second means formed on the first portion and engageable with the sealing means for permitting the sealing means to urge the connector assembly into proper axial seating with its respective receptacle.

8. The logic module assembly of claim 7, and further including;

a cable connected to the connector; and protective means surrounding the cable for forming a dead air space around the cable.

* * * * *